Patented Sept. 12, 1944

2,358,157

UNITED STATES PATENT OFFICE 2,358,157

PARTING COMPOUND

George R. Gardner, Lakewood, Ohio, assignor to Aluminum Company of America, Pittsburgh, Pa., a corporation of Pennsylvania No Drawing. Application January 7, 1942, Serial No. 425,900

7 Claims. (Cl. 22—163.5)

This invention relates to the sand casting art, and relates particularly to parting compounds used in that field.

In order to facilitate the separation of patterns and core boxes from sand molds and cores without disturbing the particles of sand, it is customary in sand foundries to dust a parting compound on the pattern or core box prior to packing around or in it the sand of the mold or core. It is an object of this invention to provide a new parting compound which is highly effective and economical.

When pulverized coal of a fineness of 100–200 mesh per inch is blown into a furnace with air and burned while suspended in the air, there is produced a finely divided residue in the form of minute particles or bubbles known as "fly ash." This material is fine enough in size that approximately 75 per cent of it or more will pass through a 400 mesh screen, and it has a specific gravity of about 2.47. It is produced chiefly by power plants, which are the principal users of powdered coal. In order to prevent its being deposited on neighboring areas, fly ash is usually collected in the smoke stacks from the combustion gases by electrical precipitation and disposed of as waste material.

The chemical composition of fly ash varies somewhat, depending upon the composition of the coal from which it is produced. A typical example consists of:

| | Per cent |
|---|---|
| Silica ($SiO_2$) | 42.5 |
| Iron oxide ($Fe_2O_3$) | 26.7 |
| Alumina ($Al_2O_3$) | 21 |
| Lime ($CaO$) | 4.6 |
| Magnesia ($MgO$) | 0.8 |
| Sulfur trioxide ($SO_3$) | 1.7 |
| Carbon | 1.7 |
| Alkali metal oxides | 1 |

In accordance with this invention, fly ash is used as a parting compound. It may be applied to metal or wood patterns or core boxes conveniently, prior to packing sand around or in them, by dusting it on the patterns or core boxes from a bag made of cloth which is sufficiently pervious to permit the fly ash to pass through it readily.

The best results are obtained with fly ash if the sand contains little or no water, for example, core sand employing an organic bonding material, such as linseed oil, soy bean oil, cereal binders, or petroleum base mineral oils. However, water is frequently used as a bonding material for the sand used in making cores and also in making green sand molds, and when water is present in the sand, it is preferable to mix thoroughly with the fly ash a small amount of a water repellent substance, specifically stearic acid, aluminum stearate, or cocoanut oil. The parting compound may contain up to 8 per cent by weight of such water repellent substances, though normally about 1–3 per cent by weight of such a water repellent substance in the parting compound is sufficient, and about 2 per cent by weight is preferred.

I claim:

1. A parting compound comprising fly ash as its principal ingredient.

2. A parting compound comprising fly ash as its principal ingredient, and stearic acid.

3. A parting compound comprising fly ash as its principal ingredient, and 1–3 per cent by weight of stearic acid.

4. A parting compound comprising fly ash as its principal ingredient, and aluminum stearate.

5. A parting compound comprising fly ash as its principal ingredient, and 1–3 per cent aluminum stearate.

6. A parting compound comprising fly ash as its principal ingredient, and cocoanut oil.

7. A parting compound comprising fly ash as its principal ingredient, and 1–3 per cent cocoanut oil.

GEORGE R. GARDNER.